United States Patent [19]
Tsai

[11] Patent Number: 4,842,399
[45] Date of Patent: Jun. 27, 1989

[54] APPARATUS AND METHOD FOR RETAINING A SPECTACLE LENS ON A RIMLESS SPECTACLE FRAME WITH A TOUGH CORD

[75] Inventor: Chiang-Tung Tsai, Tainan Hsien, Taiwan

[73] Assignee: Lien-Chiang Optician's Company, Ltd., Tainan Hsien, Taiwan

[21] Appl. No.: 150,289

[22] Filed: Jan. 29, 1988

[30] Foreign Application Priority Data

Aug. 6, 1987 [TW] Taiwan ............................... 76207542

[51] Int. Cl.⁴ .......................... G02C 1/04; G02C 5/00
[52] U.S. Cl. ..................... 351/106; 351/86; 351/154
[58] Field of Search ............... 351/86, 103, 106, 154, 351/85, 149, 150, 152

[56] References Cited

U.S. PATENT DOCUMENTS 4,466,713 8/1984 Tanaka ............................... 351/106

FOREIGN PATENT DOCUMENTS 1027777 5/1953 France ................................ 351/106
1275513 10/1961 France ................................ 351/47

Primary Examiner—Rodney B. Bovernick
Attorney, Agent, or Firm—Cushman, Darby & Cushman

[57] ABSTRACT

An assembly includes a rimless spectacle frame, a spectacle lens, and a tough cord. The frame has an inverted U-shaped portion formed in its inward surface with an open-ended lens receiving slot for engaging with the upper peripheral portion of the lens. Each end of the inverted U-shaped portion has a counterbore formed therethrough. The cord extends through two counterbores in the inverted U-shaped portion and is integrally formed with two enlarged end portions which are confined within the large-diameter outer end portions of the counterbores respectively. One of the interengaging surfaces between the lens and the cord has a slot so that they can be engaged with each other, thereby retaining the lens on the frame with the cord.

6 Claims, 6 Drawing Sheets

APPARATUS AND METHOD FOR RETAINING A SPECTACLE LENS ON A RIMLESS SPECTACLE FRAME WITH A TOUGH CORD

BACKGROUND OF THE INVENTION

This invention relates to an assembly of a rimless spectacle frame and a spectacle lens, and more particularly to an apparatus and method for retaining a spectacle lens on a rimless spectacle frame with a tough cord.

FIG. 1 shows a pair of conventional sunglasses provided with a rimless spectacle frame 1. In this figure, a spectacle lens 2 is removed from the frame 1. The frame 1 has two inverted U-shaped portions which are interconnected. Each of the inverted U-shaped portions is formed in its inward surface with an open-ended lens receiving slot in the same manner as that of ordinary spectacle frames so as to engage with the upper peripheral portion of a lens 2. The peripheral surface of the lens 2 has an annular slot 21. Each end portion of each inverted U-shaped portion is formed with two parallel through holes 11. Bridging two end portions of each inverted U-shaped portion is a tough cord 3 which is made of cattle tendon or the like. After each end portion of the cord 3 has been passed through two adjacent through holes 11 in each end portion of the inverted U-shaped portion, it is knotted. Then, the cord 3 is pulled downwardly permitting the lens 2 to be inserted into the lens receiving slot in the frame 1. Finally, the cord 3 is brought into engagement with the annular slot 21 thereby retaining the lens 2 on the frame 1. When the distal ends of the cord 3 are exposed to the exterior of the frame 1, they are cut off with a pair of scissors.

Because the cord 3 must be knotted, the time required to fasten the lenses 2 onto the frame 1 is largely increased. Furthermore, Because the knotting step is conducted by hand, the length of the cord 3 is not fixed. When the length of the cord 3 is excessive, it is difficult to retain firmly the lens 2 on the frame 1. Or, when the cord 3 has an insufficient length, it easily suffers from resilience fatigue. To insure the quality of the product, an improvement in the assembly of the rimless spectacle frame, spectacle lens, and the tough cord is required.

SUMMARY OF THE INVENTION

It is therefore the main object of this invention to provide an assembly of a rimless spectacle frame and a tough cord wherein the length of the cord is fixed.

Another object of this invention is to provide an assembly of a rimless spectacle frame and a tough cord wherein the tough cord is easily fastened to the frame.

According to an aspect of this invention, an assembly of a rimless spectacle frame, a spectacle lens, and a tough cord is provided. The frame has an inverted U-shaped portion. The inverted U-shaped portion has an inward surface in which an open-ended lens receiving slot is formed along its full length for being well-matched with the upper peripheral portion of the lens. The lens has a cord receiving slot formed in its lower peripheral surface. The cord is fastened to two ends of the inverted U-shaped portion of the frame so as to engage with the cord receiving slot in the lens, thereby retaining the lens on the inverted U-shaped portion of the frame. Each end portion of the inverted U-shaped portion has a counterbore formed therethrough. Each of the counterbores extends from the outward surface of the inverted U-shaped portion to the inward surface of the inverted U-shaped portion and consists of a large-diameter outer end portion and a small-diameter inner end portion. The cord extends through the counterbores in the frame and has an intermediate portion extending between the counterbores, and two enlarged ends confined within the large-diameter outer end portions of the counterbores respectively. The intermediate portion of the cord is engaged with the cord receiving slot in the lens for retaining the lens on the inverted U-shaped portion of the frame.

According to another aspect of this invention, a method for fastening a tough cord to a rimless spectacle frame is provided. The frame has an inverted U-shaped portion which includes first and second end portions. The first end portion has a first counterbore formed therethrough. The second end portion also has a second counterbore formed therethrough. Each of the first and second counterbores extends from the outward surface of the inverted U-shaped portion to the inward surface of the inverted U-shaped portion and consists of a large-diameter outer end portion and a small-diameter inner end portion. The cord has an enlarged end portion and a generally arrowhead-like end portion opposite to the enlarged end portion. The enlarged end portion of the cord is able to be received within the large-diameter outer end portion of the first counterbore but unable be inserted through the small-diameter inner end portion of the first counterbore. The arrowhead-like end portion of the cord is able to be inserted through the first and second counterbores but unable to be moved back through the small-diameter inner portion of the second counterbore after having been inserted through the small-diameter inner end portion of the second counterbore. The method comprises the steps: forming an extension strip integrally with the cord in such a manner that the strip projects outwardly from the tip of the arrowhead-like end portion, the strip being shaped so as to easily insert it through the first and second counterbores; inserting in turn the extension strip and the arrowhead-like end portion of the cord through the large-diameter outer end portion of the first counterbore, the small-diameter inner end portion of the first counterbore, and the small-diameter inner end portion of the second counterbore while permitting the enlarged end portion and the arrowhead-like end portion of the cord to be confined within the large-diameter outer end portions of the first and second counterbores respectively; and cutting the extension strip away from the arrowhead-like end portion of the cord.

According to still another aspect of this invention, an assembly of a rimless spectacle frame, a spectacle lens, and a tough cord is provided. The frame has an inverted U-shaped portion. The inverted U-shaped portion has an inward surface in which an open-ended first lens receiving slot is formed along its full length for being well-matched with the upper peripheral portion of the lens, and two end portions through each of which a counterbore is formed. Each of the counterbores extends from the outward surface of the inverted U-shaped portion to the inward surface of the inverted U-shaped portion. The cord has two ends which are respectively fastened to the end portions of the inverted U-shaped portion of the frame. The cord has a second lens retaining slot formed in the surface thereof which is opposite to the frame. The second lens retaining slot having two ends aligned with respective ends of the first lens retaining slot so as to engage with the lower peripheral portion of the lens.

BRIEF DESCRIPTION OF THE DRAWINGS

Other features and advantages of this invention will become apparent in the following detailed description of the preferred embodiments of this invention with reference to the accompanying drawings in which.

DETAILED DESCRIPTION OF THE PREFERRED EMBODIMENTS

Figure 1:
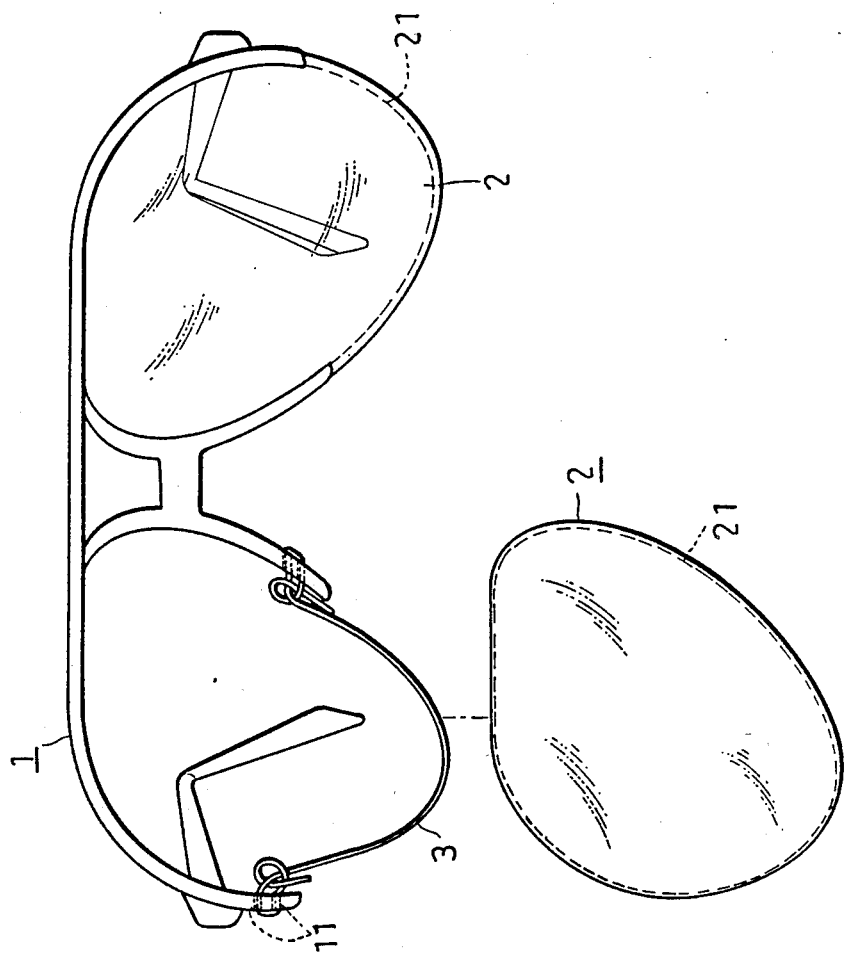
FIG. 1 is a partially exploded view of a pair of conventional sunglasses which has a rimless spectacle frame.
Figure 2:
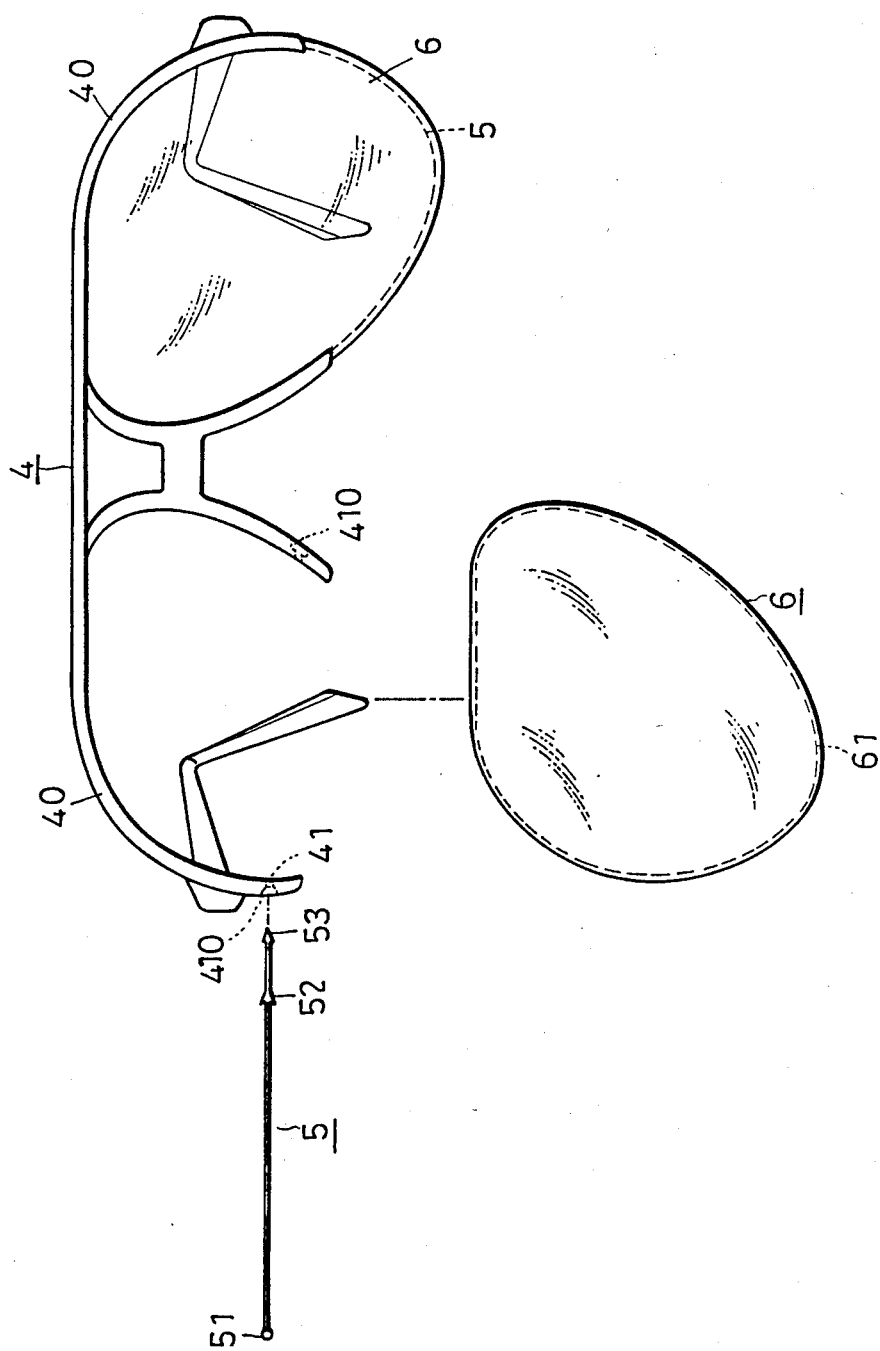
FIG. 2 is a partially exploded view showing a pair of sunglasses according to a first embodiment of this invention.

Referring to FIG. 2, a pair of sunglasses according to a first embodiment of this invention includes a rimless frame 4 which is formed with two inverted U-shaped portions 40 in a known manner. Unlike conventional rimless spectacle frames, each end portion of each inverted U-shaped portion 40 is formed with only one counterbore 41 which has a large-diameter outer end portion 410 and a small-diameter inner end portion. A first tough cord 5, for example made of nylon, bridgs two end portions of the inverted U-shaped portion 40 so as to retain a lens 6 on the inverted U-shaped portion 40. The lens 6 has an annular slot 61 in its peripheral surface. Before the first cord 5 is fastened to the frame 4, it has a spherically enlarged end portion 51 and a conical end portion 52 which looks like an arrowhead. An extension strip projects outwardly from the tip of the arrowhead-like end portion 52 and has a conical distal end 53. The extension strip has a hardness greater than that of the remaining part of the first cord 5 so that it can be pushed into and through the counterbores 41. Both the first cord 5 and the extension strip have a diameter slightly smaller than that of the small-diameter inner end portion of the counterbores 41.

Figure 3:
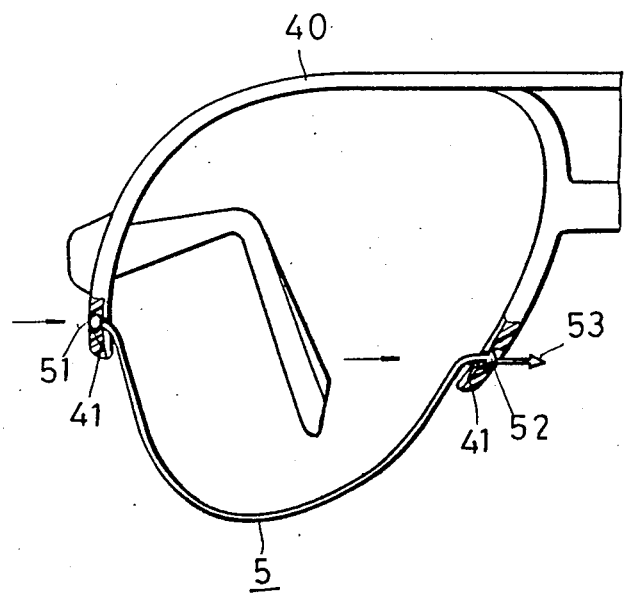
FIGS. 3 and 4 are schematic views illustrating how to assemble a tough cord and a rimless spectacle frame in accordance with the first embodiment of this invention.
Figure 4:
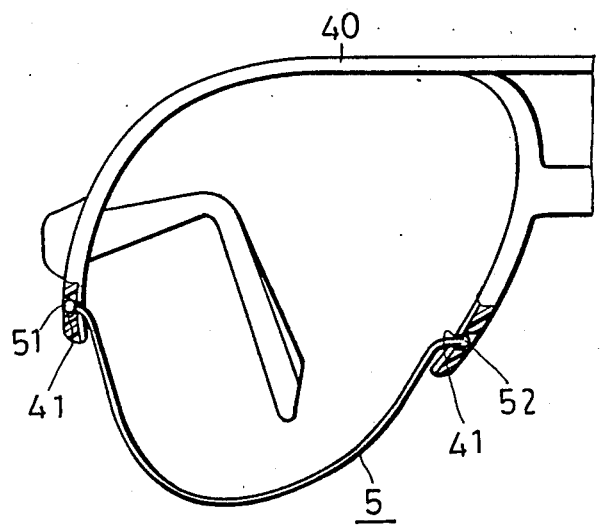

In assembly, the conical end 53 of the first cord 5 is first inserted into the large-diameter outer end portion 410 of the left counterbore 41 and is completely forced through the left counterbore 41. The first cord 5 is pulled to the right until the spherically enlarged end 51 is confined within the large-diameter outer end portion 410 of the left counterbore 41. Then, the conical end 53 of the first cord 5 is inserted into the small-diameter inner end portion of the right counterbore 41 and is forced through the right counterbore 41, as shown in FIG. 3. Finally, the extension strip is cut off by a pair of scissors, as shown in FIG. 4. As explained in the foregoing, it is easy to assemble the first cord 5 and the frame 1. Furthermore, the length of the first cord 5 is fixed. Thus, according to this invention, the manufacturing cost of a pair of sunglasses is reduced and its quality is promoted. When it is desired to insert the lens 6 into the slot in the inverted U-shaped portion 40, the cord 5 is first pulled downwardly to a tensed position thereby allowing for the insertion of the lens 6 into the slot in the inverted U-shaped portion 40. After the lens 6 has engaged with the slot in the inverted U-shaped portion 40, the operator can let go of the cord 5 to engage it with the annular slot 61 in the lens 6.

Figure 5:
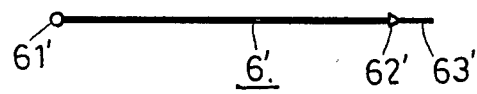
FIG. 5 is an elevational view of a tough cord according to a second embodiment of this invention.

The conical distal end 53 is optional. To simplify the structure of the first cord 5, the conical distal end 53 may be excluded. Thus, a second cord 6' (see FIG. 5) having a spherically enlarged end portion 61', an arrowhead-like end portion 62', and an extension strip 63' is also suitable for incorporating with the frame 4 in view of the fact that the extension strip can be pulled through the counterbore to the outside of the frame 4.

Figure 6:
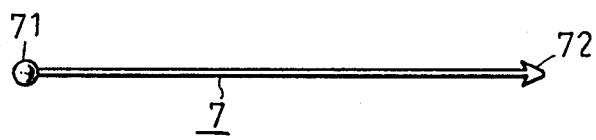
FIG. 6 is an elevational view of a tough cord according to a third embodiment of this invention.

Alternatively, referring to FIG. 6, instead of the first cord 5, a third cord 7 may be incorporated with the frame 4. The third cord 7 has a spherically enlarged end portion 71 and an arrowhead-like end portion 72. The arrowhead-like end portion 72 and the adjacent portion thereof have a hardness greater than that of the remaining part of the third cord 7 so that the arrowhead-like end portion 72 can be pushed through the counterbores 41.

Figure 7:
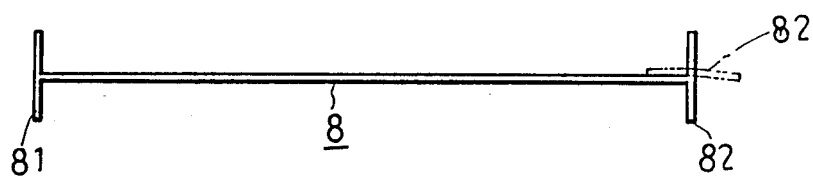
FIG. 7 is an elevational view of a tough cord according to a fourth embodiment of this invention.

As another modification to the first cord 5, referring to FIG. 7, a fourth cord 8 may be incorporated with the frame 4. The fourth cord 8 has two T-shaped ends 81 and 82 each of which has a transversely extending rod. The transversely extending rods have a hardness greater than that of the remaining part of the fourth cord 8. As long as the transversely extending rods 81 and 82 are rotated in parallel with the longitudinal axis of the fouth rod 8, they can be easily inserted through the counterbores 41.

Figure 9:
FIG. 9 is a cross-sectional view showing the intermediate portion of a tough cord according to the fifth embodiment of this invention.
Figure 8:
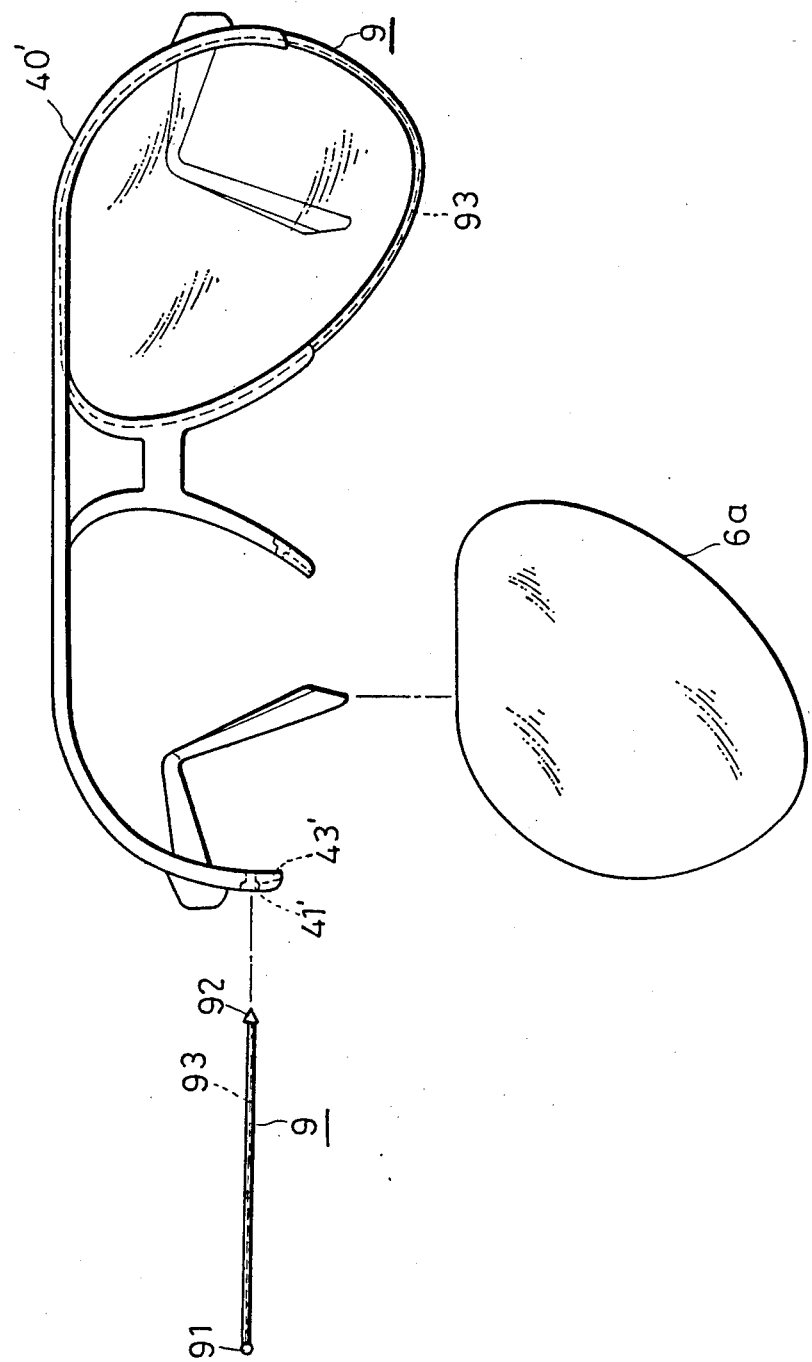
FIG. 8 is a partially exploded view showing a pair of reading glasses according to a fifth embodiment of this invention.
Figure 10:
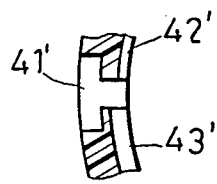
FIG. 10 is a schematic sectional view illustrating the end portion of the inverted U-shaped portion of a rimless spectacle frame according to the fifth embodiment of this invention.
Figure 11:
FIG. 11 is an elevational view of a tough cord according to a sixth embodiment of this invention.
Figure 12:
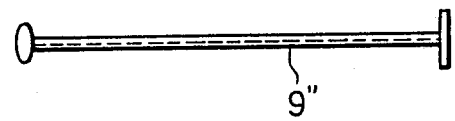
FIG. 12 is an elevational view of a tough cord according to a seventh embodiment of this invention.

Referring to FIG. 8, when used for a pair of reading glasses, in which the lenses 6a cannot be slotted, the first cords 5 may be replaced with the fifth cords 9, each of which has a spherically enlarged end portion 91, an arrowhead-like end portion 92, and an intermediate portion of a cross-section shown in FIG. 9. The intermediate portion of the fifth cord 9 is formed with a lens receiving slot 93 for incorporating with the lens receiving slot in the frame 4 to retain the lens 6a therebetween. In this case, referring to FIG. 10, the end portion of the inverted U-shaped portion 40' has a lens receiving slot 42' for receiving the upper peripheral portion of the lens 6a therein, a counterbore 41', and a deeper slot 43' for receiving a peripheral portion of the lens 6a and an intermediate portion of the fifth cord 9 therein. certainly, the enlarged end portions of the fifth cord 9 may be constructed in various forms. For example, a sixth cord 9' (see FIG. 11) may be provided with two T-shaped end portions. Or, a seventh cord 9" (see FIG. 12) may be provided with an oval end portion and a T-shaped end portion.

With this invention thus explained, it is apparent that numerous modifications and variations can be made without departing from the scope and spirit of this invention. It is therefore intended that this invention be limited only as indicated in the appended claims.

I claim:

1. An assembly of a rimless spectacle frame, a spectacle lens, and a tough cord, said frame having an inverted U-shaped portion, said inverted U-shaped portion having an inward surface in which an open-ended lens receiving slot is formed along its full length for engaging and receiving an upper peripheral portion of said lens, said lens having an cord receiving slot formed in a lower peripheral surface thereof, said cord being fastened to two ends of said inverted U-shaped portion of said frame so as to engage with said cord receiving slot in said lens, thereby retaining said lens on said inverted U-shaped portion of said frame, wherein:

each of said end portions of said inverted U-shaped portion of said frame has a counterbore formed therethrough, each of said counterbores extending from an outward surface of said inverted U-shaped portion to an inward surface of said inverted U-shaped portion and consisting of a large-diameter outer end portion and a small-diameter inner end portion, said cord extending through said counterbores in said frame and having an intermediate portion extending between said counterbores, and two enlarged ends confined within said large-diameter outer end portions of said counterbores, respectively, said intermediate portion being engaged with said cord receiving slot in said lens for retaining said lens on said inverted U-shaped portion of said frame at least one of said enlarged ends being sized and shaped so as to be insertable through each of said counterbore but not removable back through said small diameter portions of said counterbores.

2. An assembly as claimed in claim 1, wherein one of said enlarged ends of said cord is generally shaped in the form of an arrowhead.

3. An assembly as claimed in claim 1, wherein one of said enlarged ends of said cord is T-shaped.

4. A method for fastening a tough cord to a rimless spectacle frame, said frame having an inverted U-shaped portion, said inverted U-shaped portion having first and second end portions, said first end portion having a first counterbore formed therethrough, said second end portion having a second counterbore formed therethrough, each of said first and second counterbores extending from an outward surface of said inverted U-shaped portion to an inward surface of said inverted U-shaped portion and consisting of a large-diameter outer end portion and a small-diameter inner end portion, said cord having an enlarged end portion and a generally arrowhead-like end portion opposite to said enlarged end portion, said enlarged end portion of said cord being able to be received within said large-diameter outer end portion of said first counterbore but unable to be inserted through said small-diameter inner end portion of said first counterbore, said arrowhead-like end portion of said cord being able to be inserted through said first and second counterbores but unable to be moved back through said small-diameter inner end portion of said second counterbore after having been inserted through said small-diameter inner end portion of said second counterbore, said method comprising:

forming an extension strip integrally with said cord in such a manner that said strip projects outwardly from a tip of said arrowhead-like end portion, said strip being shaped so as to be easily inserted through said first and second counterbores;

inserting in turn said extension strip and said arrowhead-like end portion of said cord through said large-diameter outer end portion of said first counterbore, said small-diameter inner end portion of said first counterbore, and said small-diameter inner end portion of said second counterbore while permitting said enlarged end portion and said arrowhead-like end portion of said cord to be confined within said large-diameter outer end portions of said first and second counterbores respectively; and cutting said extension strip away from said arrowhead-like end portion of said cord.

5. An assembly of a rimless spectacle frame, a spectacle lens, and a tough cord, said frame having a inverted U-shaped portion, said inverted U-shaped portion having an inward surface in which an open-ended first lens receiving slot is formed along its full length for engaging and receiving an upper peripheral portion of said lens, and two end portions through each of which a counterbore is formed, each of said counterbores extending from an outward surface of said inverted U-shaped portion to an inward surface of said inverted U-shaped portion, said cord having two enlarged ends, at least one of said enlarged ends being sized and shaped so as to be insertable through each of said counterbores but not removable back through said counterbores so that said enlarged ends of said cord are respectively fastened to said end portions of said inverted U-shaped portion of said frame, said cord including a second lens retaining slot formed in a surface thereof which is in facing relation to said frame, said second lens retaining slot having two ends aligned with respective ends of said first lens retaining slot so as to engage a lower peripheral portion of said lens.

6. An assembly as claimed in claim 2 further comprising an extension strip formed integrally with said cord so as to project outwardly from a tip of said arrowhead-like end portion, said extension strip being sized and shaped so that it is insertable through said first and second counterbores.

* * * * *